US010822232B2

(12) United States Patent
Halsey

(10) Patent No.: US 10,822,232 B2
(45) Date of Patent: Nov. 3, 2020

(54) SOLID HYDROGEN REACTION SYSTEM AND METHOD OF LIBERATION OF HYDROGEN GAS

(71) Applicant: GE AVIATION SYSTEMS LLC, Grand Rapids, MI (US)

(72) Inventor: Colin John Halsey, Tewkesbury (GB)

(73) Assignee: GE Aviation Systems LLC, Grand Rapids, MI (US)

(*) Notice: Subject to any disclaimer, the term of this patent is extended or adjusted under 35 U.S.C. 154(b) by 16 days.

(21) Appl. No.: 16/244,793

(22) Filed: Jan. 10, 2019

(65) Prior Publication Data

US 2019/0144272 A1 May 16, 2019

Related U.S. Application Data

(62) Division of application No. 15/053,272, filed on Feb. 25, 2016, now Pat. No. 10,214,417.

(51) Int. Cl.
*C01B 3/06* (2006.01)
*C01B 3/00* (2006.01)

(52) U.S. Cl.
CPC .......... *C01B 3/065* (2013.01); *C01B 3/0026* (2013.01); *C01B 2203/066* (2013.01); *Y02E 60/327* (2013.01); *Y02E 60/362* (2013.01)

(58) Field of Classification Search
CPC .......................... C01B 3/065; B01J 2219/1946
See application file for complete search history.

(56) References Cited

U.S. PATENT DOCUMENTS

| | | | | |
|---|---|---|---|---|
| 2,516,934 A | * | 8/1950 | Weaver | B01J 7/02 422/239 |
| 2,623,812 A | * | 12/1952 | Eborall | C01B 3/10 423/658 |
| 2,721,789 A | * | 10/1955 | Gill | C01B 3/061 422/202 |
| 2,980,731 A | | 4/1961 | Alheritiere et al. | |
| 3,458,288 A | * | 7/1969 | Lafyatis | C01B 3/00 422/113 |
| 4,444,727 A | | 4/1984 | Yanagihara et al. | |
| 5,106,597 A | * | 4/1992 | Plester | B01J 7/02 422/305 |
| 5,593,640 A | * | 1/1997 | Long | B01J 7/02 422/111 |

(Continued)

FOREIGN PATENT DOCUMENTS

| | | |
|---|---|---|
| DE | 10 2014 211422 A1 | 12/2015 |
| EP | 1376728 A3 | 11/2006 |
| KR | 10-2010-0129210 A | 12/2010 |

OTHER PUBLICATIONS

International Search Report and Written Opinion issued in connection with corresponding PCT Application No. PCT/US17/19284 dated May 8, 2017.

*Primary Examiner* — Matthew J Merkling
(74) *Attorney, Agent, or Firm* — McGarry Bair PC

(57) ABSTRACT

A solid hydrogen reaction system and method of liberating hydrogen gas includes the utilization of a reactor having a body that defines a reaction chamber, having a first narrow end and a second wider end such that the reactor has an increasing cross-sectional area from the first end toward the second end, for facilitating a reaction to liberate hydrogen gas stored in a hydrogen storage solid located within the reaction chamber.

11 Claims, 7 Drawing Sheets

(56) References Cited

U.S. PATENT DOCUMENTS

| | | | |
|---|---|---|---|
| 6,568,633 B2 | 5/2003 | Dunn | |
| 6,641,084 B1 | 11/2003 | Huber et al. | |
| 7,326,263 B2* | 2/2008 | Andersen | B01J 7/02 |
| | | | 422/129 |
| 7,380,749 B2 | 6/2008 | Fucke et al. | |
| 7,534,275 B2* | 5/2009 | Tonca | B01J 8/009 |
| | | | 423/648.1 |
| 7,986,052 B2 | 7/2011 | Marconi | |
| 8,016,228 B2 | 9/2011 | Fucke et al. | |
| 8,137,854 B2 | 3/2012 | Gans | |
| 8,323,364 B2* | 12/2012 | Goble | B01J 7/02 |
| | | | 423/644 |
| 8,372,554 B2 | 2/2013 | Hoffjann et al. | |
| 8,394,552 B2 | 3/2013 | Gummalla et al. | |
| 8,722,272 B2 | 5/2014 | Westenberger et al. | |
| 2002/0100215 A1 | 8/2002 | Hatanaka | |
| 2003/0113259 A1* | 6/2003 | Rusta-Sallehy | B01J 19/249 |
| | | | 423/658.2 |
| 2003/0230671 A1 | 12/2003 | Dunn | |
| 2005/0229490 A1* | 10/2005 | Stevens | B01J 8/025 |
| | | | 48/198.7 |
| 2006/0237583 A1 | 10/2006 | Fucke et al. | |
| 2007/0158500 A1 | 7/2007 | Sridhar et al. | |
| 2010/0021778 A1 | 1/2010 | Steinshnider et al. | |
| 2011/0240795 A1 | 10/2011 | Brugger et al. | |
| 2013/0099560 A1 | 4/2013 | Shipley et al. | |
| 2016/0049675 A1* | 2/2016 | Chen | H01M 8/065 |
| | | | 429/411 |
| 2018/0208463 A1 | 7/2018 | Halsey et al. | |

* cited by examiner

SOLID HYDROGEN REACTION SYSTEM AND METHOD OF LIBERATION OF HYDROGEN GAS

CROSS-REFERENCE TO RELATED APPLICATIONS

This application is a division of U.S. application Ser. No. 15/053,272, filed on Feb. 25, 2016, titled "SOLID HYDROGEN REACTION SYSTEM AND METHOD OF LIBERATION OF HYDROGENT GAS". The above listed application is herein incorporated by reference.

BACKGROUND OF THE INVENTION

Hydrogen can be a fuel for creating consumable energy by way of combustion in an engine or conversion from chemical energy into electrical energy through a chemical reaction, such as in a fuel cell. In the aforementioned examples, the hydrogen fuel is typically supplied in gaseous form. In order to generate consumable energy for an extended period of time in such systems, a large amount of hydrogen gas, and thus a large amount of potential energy, can be stored for consumption.

Energy storage systems for hydrogen can include gaseous storage tanks and can be configured to hold hydrogen gas at high pressures near 700 bar in order to store hydrogen in adequate quantities for particular energy consumption needs. High pressure energy storage systems, such as those storing hydrogen gases at pressures near 700 bar, must include more robust components designed to handle or account for such high pressures. Additionally, hydrogen can be stored in a liquid form, however, very low temperatures are required to maintain the liquid form and maintain appropriate pressure.

BRIEF DESCRIPTION OF THE INVENTION

In one aspect, embodiments of the invention relate to a solid hydrogen reaction system including a reactor having a body with a first end and a second end where the second end is wider that the first end and where the body defines a reaction chamber that has an increasing cross-sectional area from the first end to the second end. The system further includes an inlet disposed at the first end of the body for coupling the reaction chamber to a reactant and a cover selectively mountable to the second end for selectively closing the reaction chamber. The reaction chamber is configured to receive a hydrogen storage solid and receive a reactant or heat introduced at the inlet to the reaction chamber to begin a chemical reaction to liberate hydrogen gas from the hydrogen storage solid.

In another aspect, embodiment of the invention relate to a solid hydrogen reaction system including a reactor defining a reaction chamber and having a first end and a wider second end spaced from the first end along a longitudinal axis defining an increasing cross-sectional area from the first end toward the second end. The reaction chamber is configured to contain a hydrogen storage solid such that a chemical reaction takes place within the reaction chamber and hydrogen gas is liberated from the hydrogen storage solid.

In yet another aspect, a method of liberating hydrogen gas includes (1) providing a hydrogen storage solid within a reactor defining an increasing cross-sectional area within a reaction chamber having a narrow first end and a wide second end, (2) introducing one of a reactant or heat into the reaction chamber to initiate a chemical reaction with the hydrogen storage solid, and (3) sustaining the chemical reaction along the reaction chamber from the narrow first end toward the wide second end.

DESCRIPTION OF EMBODIMENTS OF THE INVENTION

The invention is related to the generation of hydrogen from solid materials using heat or liquid reactants. One non-limiting example of such a system can include an environment using hydrogen as a fuel for creating consumable energy, for example, by way of combustion in an engine or conversion from chemical energy into electrical energy through a chemical reaction. While this description is primarily directed toward a hydrogen storage system to provide hydrogen gases for conversion into electrical energy to power electrical systems for an aircraft, embodiments of the disclosure are applicable to any solid state delivery system. The disclosure can be applicable to generate emergency power or to provide hydrogen gases to generate stand-alone or supplemental electrical power in otherwise non-emergency operations, such as takeoff, landing, or cruise flight operations.

Figure 1:
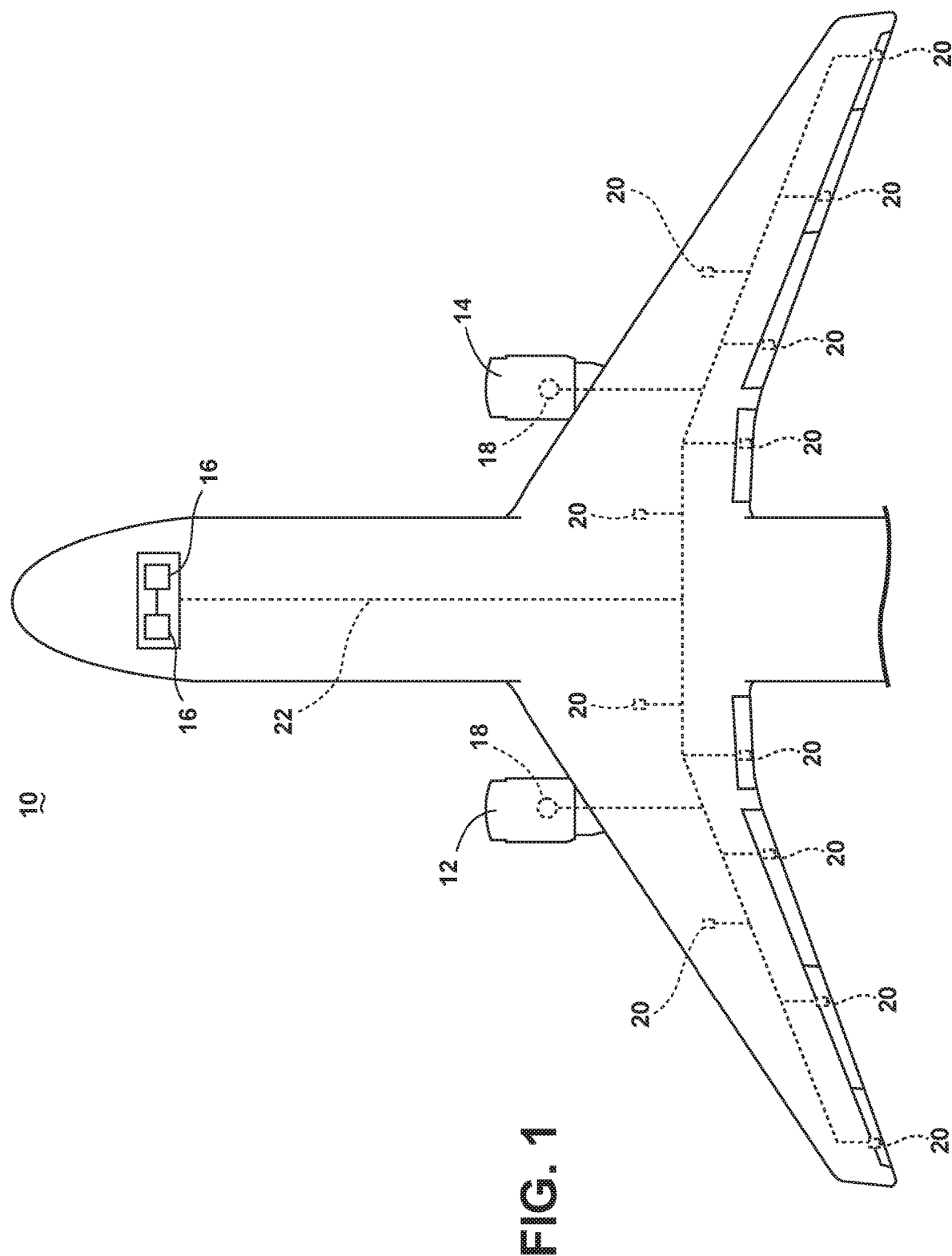
FIG. 1 is a top down schematic view of an aircraft and power distribution system, in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further comprise at least one electric machine, such as a generator 18. The aircraft is shown further comprising a plurality of power-consuming components, or electrical loads 20, for instance, an actuator load, flight critical loads, and non-flight critical loads. The electrical loads 20 are electrically coupled with at least one of the generators 18 via a power distribution system, for instance, bus bars 22. In the aircraft 10, the operating left and right engine systems 12, 14 provide mechanical energy which can be extracted via a spool, to provide a driving force for the generator 18. The generator 18, in turn, provides the generated power to the bus bars 22, which delivers the power to the electrical loads 20 for load operations.

The aircraft 10 or power system can include additional power sources for providing power to the electrical loads 20, and can include additional power sources 16, ram air turbine systems, starter/generators, batteries, super capacitors, or the like. The depiction of the aircraft 10, additional power sources 16, engines 12, 14, generators 18, electrical loads 20, and bus bars 22 are provided merely as one non-limiting example schematic aircraft 10 configuration, and is not intended to limit embodiments of the disclosure to any particular aircraft 10 or operating environment. It will be understood that while one embodiment of the invention is shown in an aircraft environment, the invention is not so limited and has general application to electrical power systems in non-aircraft applications, such as other mobile applications and non-mobile industrial, commercial, and residential applications.

Additionally, while various components have been illustrated with relative position of the aircraft (e.g. the additional power sources 16 near the head or cockpit of the aircraft 10), embodiments of the disclosure are not so limited, and the components are not so limited based on their schematic depictions. For example, the additional power sources 16 can be located in an aircraft 10 wing, a tail section, or farther toward the rear of the aircraft fuselage. Additional aircraft configurations are envisioned.

Figure 2:
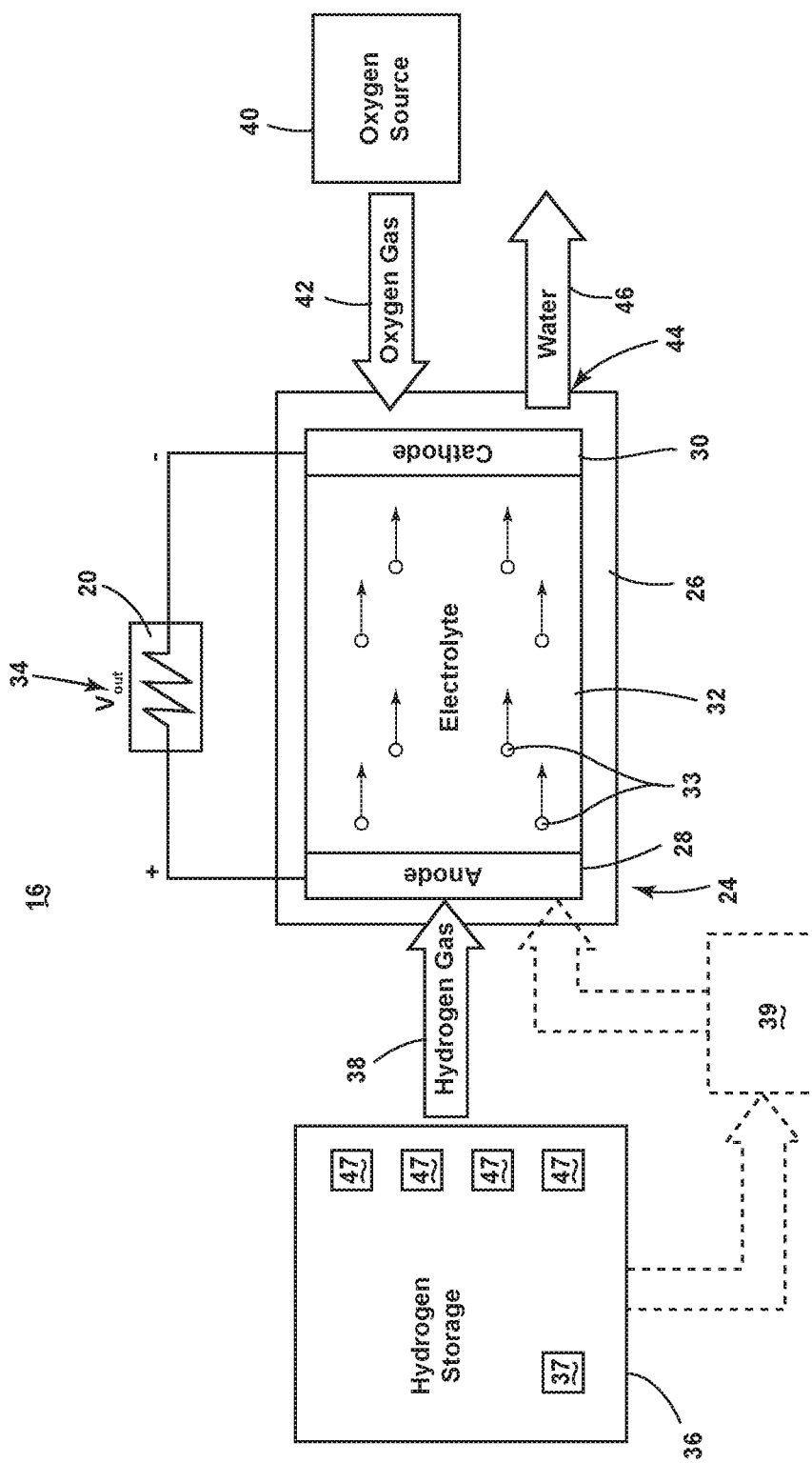
FIG. 2 is a schematic view of the operation of a fuel cell having a hydrogen storage system, which can be utilized in the aircraft of FIG. 1.

FIG. 2 illustrates an example configuration of operation of the additional power source 16, shown as a fuel cell system 24, in accordance with various aspects described herein. The fuel cell system 24 includes a fuel cell 26 including an anode 28 (positive side of the fuel cell 26) and cathode 30 (negative side of the fuel cell 26) separated by an electrolyte 32 that allows positively charged hydrogen ions 33 to move between the anode 28 and cathode 30. The fuel cell 26 can include a voltage output 34 electrically coupled with the anode 28 and cathode 30 to provide current or electrical power generated between the anode 28 and cathode 30. The voltage output 34 can, for example, power one or more electrical loads 20, illustrated by a representative single load 20.

The fuel cell system 24 additionally includes a hydrogen storage system 36 including a set of hydrogen storage units 47 in communication with the anode 28 of the fuel cell 26 such that the hydrogen storage system 36 can provide hydrogen gas 38 to the anode 28. It will be understood that "a set" can include any number, including only one. The hydrogen storage unit(s) 47 can be configured to provide the hydrogen gas 38 independently of, or simultaneous with, other units 47, as designed base on the hydrogen gas 38 needs or demands of the fuel cell system 24. The hydrogen storage system 36 can optionally include a controller module 37 configured to control the operation of the storage system 36 or the operation of the set of hydrogen storage units 47, which will be further explained below. The fuel cell system 24 can further include an oxygen source 40 configured to provide oxygen gas 42 to the cathode 30 of the fuel cell 26, and a water outlet 44 for removing water 46 from the cathode 30 of the fuel cell 26. While an oxygen source 40 is depicted, other sources of oxygen can be included, such as ambient air.

The fuel cell system 24 can optionally include an intermediary hydrogen gas storage unit 39, illustrated in dotted outline, configured to store the hydrogen gas 38 or excess hydrogen gas 38 that has been provided by the hydrogen storage system 36 or hydrogen storage units 47. Configurations of the fuel cell system 24 can be included wherein the hydrogen gas 38 is supplied to the anode 28 only by way of the optional intermediary hydrogen gas storage unit 39. One non-limiting example of an intermediary hydrogen gas storage unit 39 can include a pressurized storage tank.

The anode 28 or cathode 30 can further include one or more catalysts that cause, encourage, or promote the hydrogen gas 38 to undergo oxidation reactions to generate the hydrogen ions 33 and electrons. The ions 33 can then traverse the electrolyte 32, while the electrons are drawn to the voltage output 34 or electrical load 20. In this sense, the fuel cell 26 can generate direct current (DC). At the cathode 30, the hydrogen ions 33, the electrons, and oxygen gas 42 form the water 46 which is removed from the fuel cell 26 by way of the water outlet 44.

The anode 28 and cathode 30 can be selected from various conductive materials having a potential difference and configured to produce the above-described chemical reactions. Particular anode 28 or cathode 30 materials are not germane to the invention. Additionally, the electrolyte 32 can be selected from various electrolytic materials configured for fuel cell 26 operations, including, but not limited to proton exchange membrane-type fuel cells (PEM fuel cells, or PEMFC) or solid oxide-type fuel cells. Additionally, while the fuel cell 26 is schematically illustrated as a single "cell" having one anode 28, one cathode 30, and one electrolyte 32, embodiments of the disclosure are envisioned wherein individual cells are "stacked," or placed in series, to create a desired voltage output 34 configured to meet a particular operating requirement. For example, an additional power source 16 can be required to deliver DC power at 270V DC. Additional or alternative power operating requirements are envisioned wherein, for example, multiple stacked fuel cells 26 can be configured in parallel to provide additional current. Moreover, while the illustrated embodiment describes a DC voltage fuel cell system 24, embodiments of the disclosure are equally applicable with fuel cell systems 24 configured to provide an alternating current (AC) voltage output, for example, by way of an inverter system (not shown).

Figure 3:
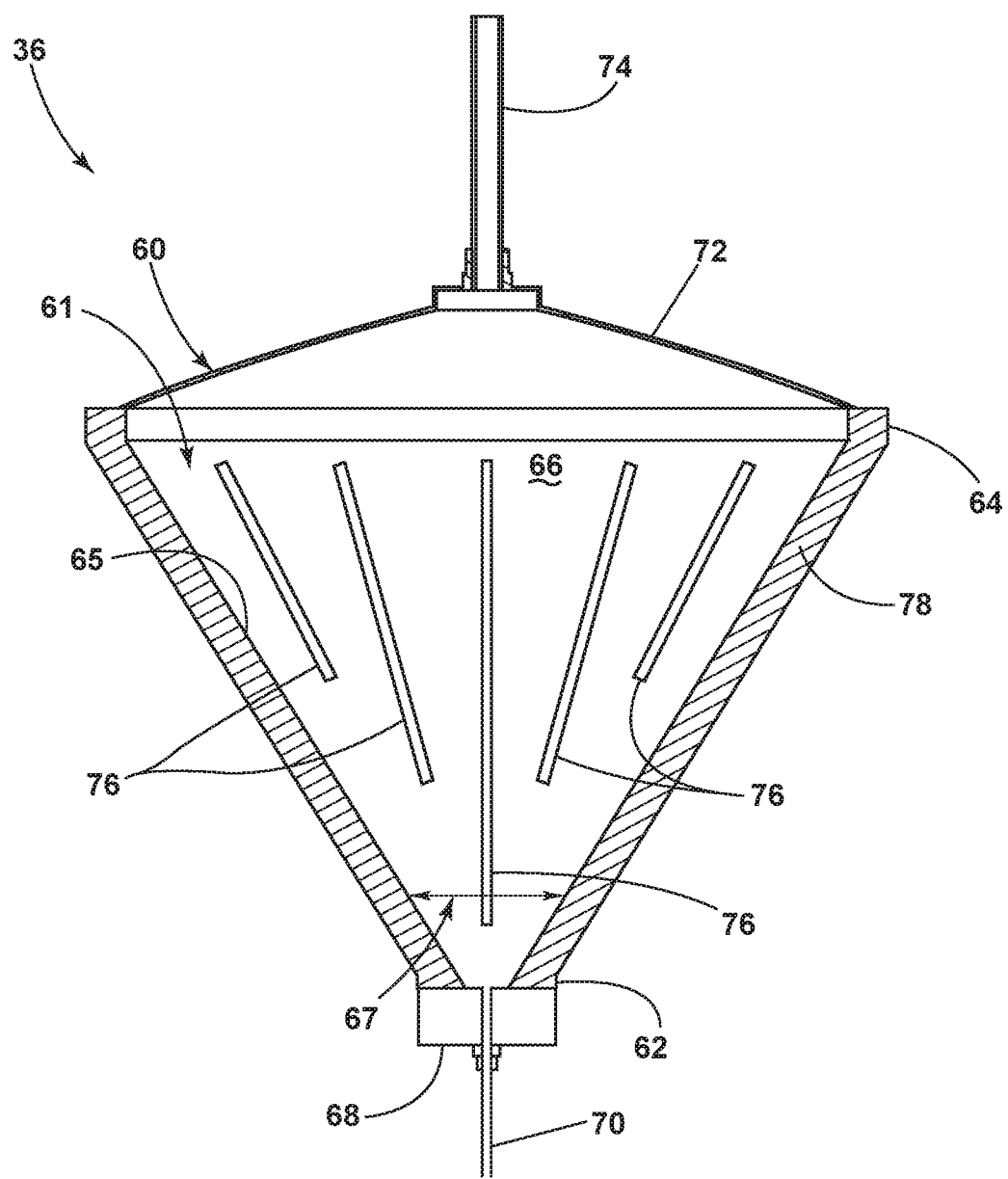
FIG. 3 is a cross-sectional view of a reactor that can be the hydrogen storage system of FIG. 2.

Looking at FIG. 3, a volume of a hydrogen storage solid can be stored in the hydrogen storage system 36 which can be a cone-shaped reactor 60. The reactor 60 can have a body 61 with a narrow first end 62 and a wide second end 64, with the wide second end 64 being wide as compared to the narrow first end 62. The body 61 can have a sidewall 65 defining a width 67 that increases in a direction from the first end 62 toward the second end 64. A reaction chamber 66 is defined between the narrow first end 62 and the wide second end 64. It should be understood that the cone-shaped reactor 60 is exemplary and will be used herein to facilitate understanding of the invention. In alternative examples, the reactor can have an increasing cross-section from the first end 62 toward the second end 64, but can be increasing in an arcuate manner, such that the sidewall 65 is arcuate, defining a concave or convex profile, in non-limiting examples. Any such reactor 60 is contemplated, having a first end 62 and a second end 64 such that the second end 64 is wider than the first end 62 to define an increasing cross-sectional area from the first end 62 to the second end 64. Such increasing cross-sectional areas can be continuously or non-continuously increasing.

The first end 62 can be sealed with a plug 68 having an inlet 70. The inlet 70 can be fluidly coupled with the reaction chamber 66 and configured to deliver a reactant, such as water or steam, to the reaction chamber 66. The reactant can be dispersed within the reaction chamber 66 after being provided by the inlet 70.

The second end 64 can be enclosed by a cap 72 having a gas outlet 74. The gas outlet 74 can include a port configured to deliver hydrogen gas located in the reaction chamber 66 to the fuel cell system 24, the intermediary hydrogen gas storage unit 39, or the fuel cell 26. Embodiments of the gas outlet 74 can be further configured such that only hydrogen gases are allowed pass through the outlet 74. For example, the gas outlet 74 can include a gas-permeable membrane or the like configured to allow only hydrogen gases to permeate the membrane. In this sense, other materials that can be located in the reaction chamber 66, including, but not limited to, steam or water, will be prevented from passing through the gas outlet 74.

One or more heat rods 76 can be disposed or mounted within the reaction chamber 66 for dispersing the heat evenly within the reaction chamber 66. Additionally, the body 61 can be encased by an insulation layer 78 preventing heat loss during the pre-heating or during the reaction.

It should be appreciated that, alternatively, the first end 62 can be sealed. As such, there would be no inlet 70 to deliver a reactant for dispersal within the reaction chamber 66. In this alternative example, heat can be applied to the reaction chamber 66 to initiate the chemical reaction.

Figure 4:
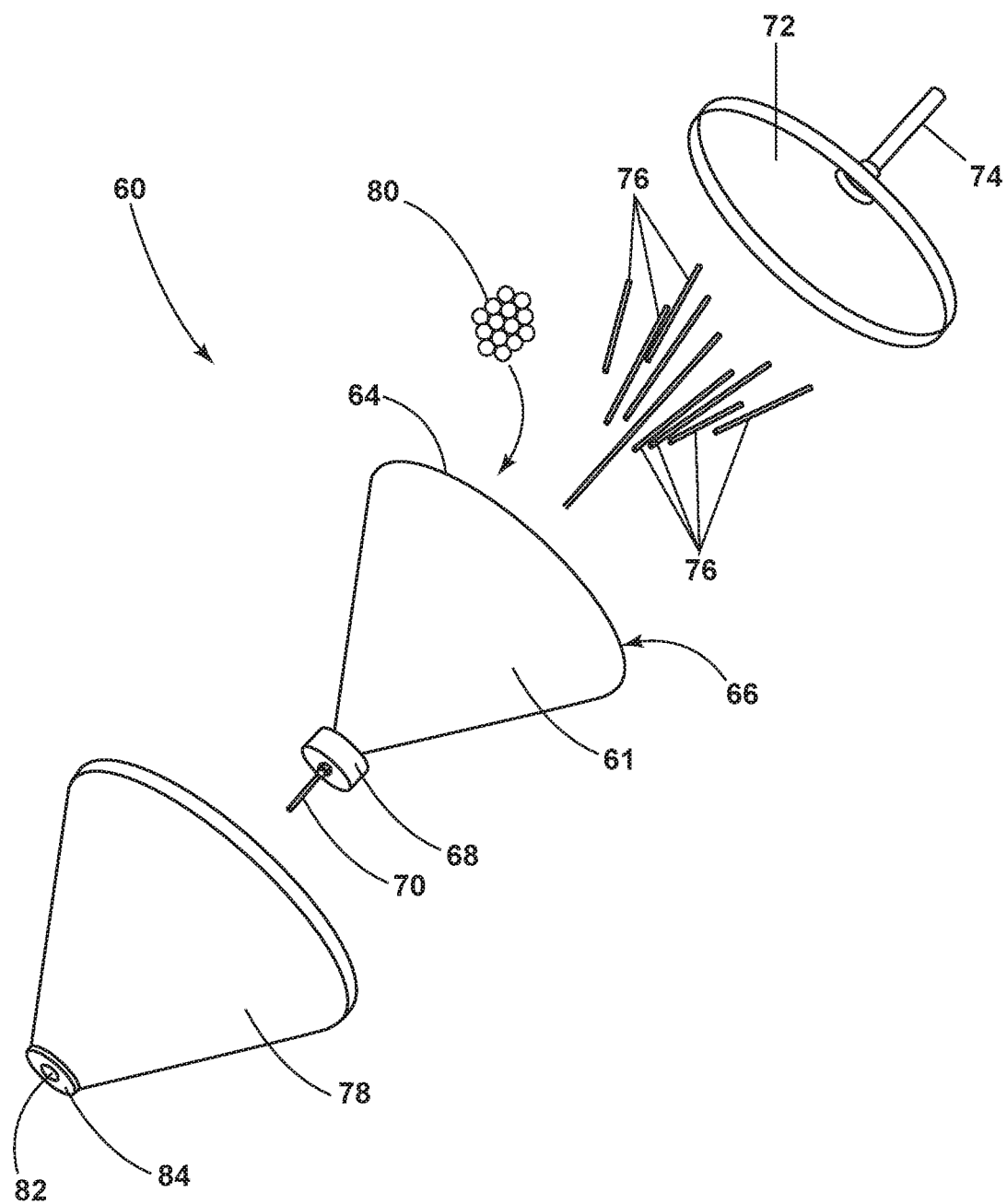
FIG. 4 is a partially exploded view of the reactor of FIG. 3.

Looking at FIG. 4, a partially exploded view further illustrates the elements included in the reactor 60. Prior to a reaction, a hydrogen storage solid 80 can be place within the reaction chamber 66, which is closed at the narrow first end 62 by the plug 68. The heat rods 76 can also be installed therein, being sealed within the reaction chamber 66 by the cap 72. The hydrogen storage solid 80 can be a powdered or otherwise malleable material. This facilitates the arrangement of both the hydrogen storage solid 80 and the heat rods 76. The insulation layer 78 can slide around the body 61 and can include an aperture 82 adapted to receive the inlet 70 and a bottom surface 84 adapted to abut the plug 68.

Figure 5:
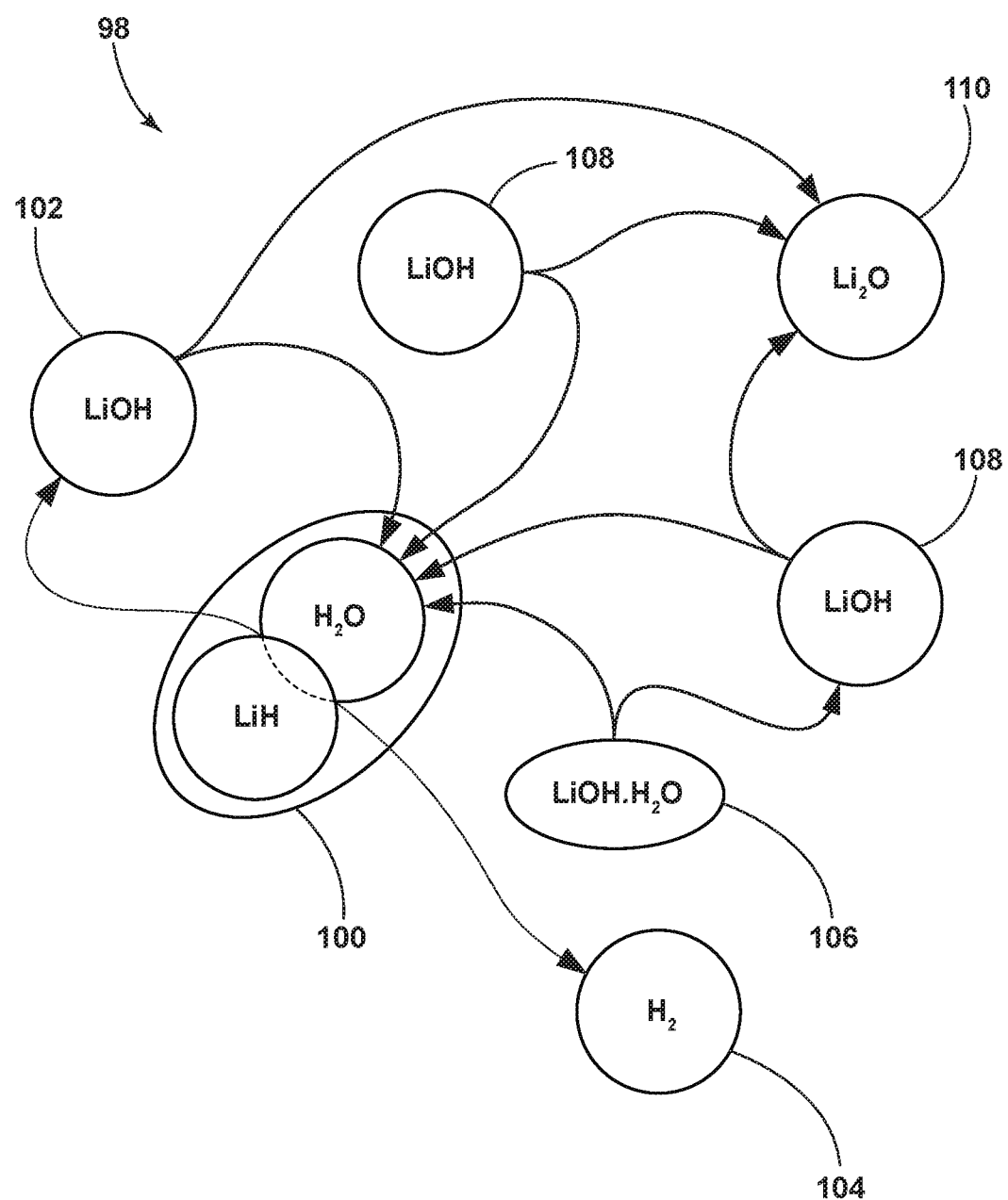
FIG. 5 is a schematic view of a solid state hydrogen chemical reaction.

FIG. 5 illustrates an example chemical reaction 98 which can occur in the reaction chamber 66 to release a volume of hydrogen gas 38. The example shown uses a mix of Lithium Hydride with Lithium Hydroxide and Lithium Hydroxide Monohydrate ($LiOH.H_2O$). In alternative embodiments, any metal hydride, such as magnesium hydride, can be used in place of LiH as the hydrogen storage solid 80. It should be appreciated that as FIG. 5 will be described in reference to the individual reactions which combine to generate the entire reaction illustrated in FIG. 5. The entire reaction being representative of a reaction occurring within the reactor 60 to liberate a volume of hydrogen gas.

At 106, heat can be introduced to the hydrogen storage solid, decomposing $LiOH.H_2O$ to LiOH and $H_2O$ to initiate a chemical reaction. Alternatively, a reactant such as water or steam can be introduced at 100 via the inlet 70 to begin the reaction.

LiH readily reacts with water ($H_2O$) at room temperature. For example, $H_2O$ can be introduced via the inlet 70 to begin the reaction, and produce LiOH, at 102, and Hydrogen ($H_2$), at 104, shown in equation (1) below:

  (1)

The base reaction equation (1) produces hydrogen gas along with LiOH or $LiOH.H_2O$. If the temperature of the reaction remains below 100° Celsius (C), $LiOH.H_2O$, forms. Formation of $LiOH.H_2O$ will require additional water to maintain the reaction shown in equation (2) below:

  (2)

In order to avoid the formation of $LiOH.H_2O$, the reaction chamber 66 should be kept above 100° C. by external heating. Alternatively, the temperature of the reaction chamber 66 can be elevated above 100° C. by the heat generated by the base reaction. The concentration of the heat produced, i.e. the localized heating effect is primarily dictated by the shape of the reaction chamber 66. In the example utilizing a reactant, the use of water as steam avoids a pressure and volume increase from the phase change of water as well as from the potential formation of $LiOH.H_2O$. As the chemical reaction continues, at about 400° C. the LiOH contained in the chemical mix 108, and LiOH bi-product of the base reaction 102 will decomposed to continuously produce water to maintain the reaction shown in equation (3) below:

  (3)

Thus, the overall reaction can be represented by equation (4) below:

  (4)

As a result, $H_2$, at 104, and Lithium Oxide ($Li_2O$), at 110, remain as products of the reaction. The per-mole of reactant would release around 20 kilojoules (kJ) of energy. However, heating the reactants to 400° C. in order to maintain the reaction requires 31 kJ of energy and power is required to be input into the reactor 60. The power supplied can be used to control the rate of $H_2$ production. The required power represents about 9% of the eventual power output of a PEM fuel cell, such as the fuel cell 26, supplied with the $H_2$. In order to reduce this burden while maintaining control of the production of $H_2$, $LiOH.H_2O$ at 106 can be added to the reaction. $LiOH.H_2O$ decomposes at a much lower energy rate than LiOH. Thus, the ratio of LiOH to $LiOH.H_2O$ can determine whether heat is required to maintain the chemical reaction, or whether heat is released by the reaction. Thus, a net reduction in required energy is realized without compromising the $H_2$ yield when utilizing $LiOH.H_2O$ within the reaction.

As such, the ratio of LiOH, LiH, and $LiOH.H_2O$ permits the reactor 60 to be designed to range from 11 kilojoules per mole (kJ/mol) of energy to be input to an overall excess of energy of 22 kJ/mol, some of which can be utilized to compensate for the heat loss. Assuming no overall heat loss, the ratio of LiOH to $LiOH.H_2O$ can be about 7-to-1. As such, equation (5) below represents the overall reaction:

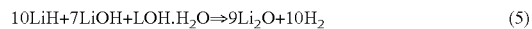  (5)

At the ratio of 7-to-1, the resultant net output would be about 30 watts (W) having no burden on the fuel cell 26. At a ratio of 8-to-1, LiOH to $LiOH.H_2O$, the burden on the fuel cell 26 would be about 2.5%. The overall reaction does not consider an initial heat input to initiate the reaction, which would have a maximum requirement of 6 kJ/mol, having a minor burden on the fuel cell 26.

It should be understood that while the chemical reaction 98 illustrated in FIG. 5 can be initiated with the introduction of a reactant such as water, it should also be understood that the reaction can be initiated with the introduction of heat, provided, for example, at the inlet 70. In the case where heat initiates the reaction 98, all of the reactants are present within the reactor 60. For example, the water can be stored as $LiOH.H_2O$. Introduction of the heat begins to reaction to liberate a portion of the water to sustain the reaction after the initial introduction of heat. Additionally, it should be appreciated that the conical shape of the reactor 60 requires only a small initial amount of heat to begin the reaction 98. The expansive dimension of the conical reactor 60 provides for sustaining the chemical reaction 98 upon the small initial introduction of heat.

Figure 6:
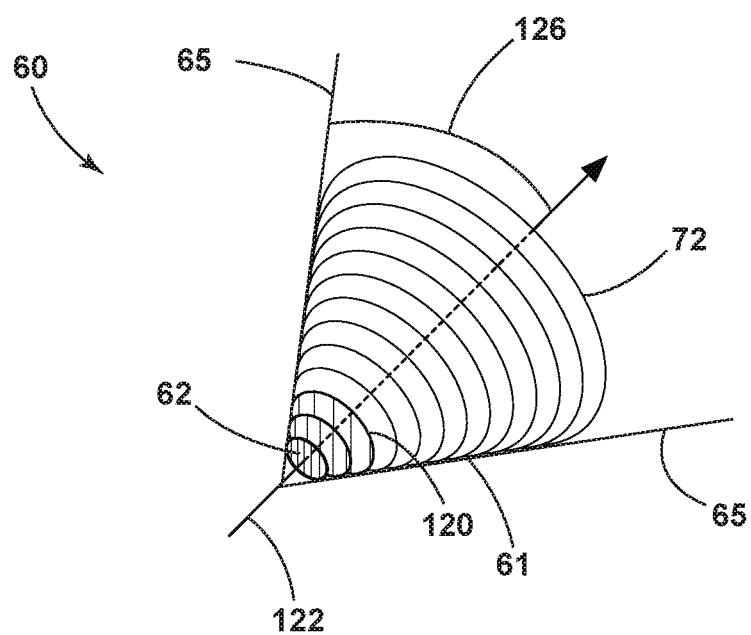
FIG. 6 is a side view of the reactor of FIG. 4 illustrating direction of the reaction front.

Looking now at FIG. 6, it will be discussed how the exemplary reaction 98 can be properly sustained within the reactor 60. The reaction 98 can begin with the introduction of a reactant, like water or steam, at the first end 62 through the inlet 70. Alternatively, an initial introduction of heat at the first end 62 can initiate the chemical reaction. Prior to initiating the reaction, the reactor 60 can be pre-heated to facilitate sustaining of the reaction 98. As heat from the reaction increases, the heat rods 76 can dissipate the extra heat within the reaction chamber 66 if the system is producing heat and removal of such heat is required.

As the reaction occurs, a reaction front 120, illustrated with solid hatched lines, extends from the first end 62 toward the second end 64 along a longitudinal axis 122 through the axial center of the reactor 60. The annular sidewall 65 of the reactor 60 defines a reactor angle 126 between the annular sidewall 65 and the longitudinal axis 122.

The reactor angle 126, in combination with the ratio of $LiOH.H_2O$ to LiOH can determine whether the system produces heat or requires heat for sustaining the reaction 98. A larger reactor angle 126 will require more heat while a lesser reactor angle 126 will produce heat. As such, within a system that produces heat, the reaction 98 can be controlled by cooling the system. The amount of cooling provided can slow the reaction until a point is reached where the reaction 98 will no longer self-sustain. Alternatively, for a system that requires heat, increasing the amount of heat supplied and dissipating it through the heating rods 76, can increase the reaction rate. Removal of the heat source will cause the reaction 98 to eventually stop. The heating rods 76 can be used to evenly distribute the heat within the system, resulting in an even, axially-moving reaction while minimizing the amount of $LiOH.H_2O$ required to maintain the reaction to minimize overall power input, thus minimizing overall weight of the hydrogen storage solid 80.

The conical shape of the reactor 60 minimizes the amount of initial heat input required to start the reaction 98. Heating a small quantity at the first end 62 uses less energy than heating a large quantity, so applying heat at the first end 62 minimizes the amount of heat to initiate the reaction. Sustaining the reaction is then based on the expanding quantity and the ratio of $LiOH.H_2O$ to LIOH. The expanding cross-sectional area of the reactor 60 facilitates the increasing thermal energy as the reaction 98 moves toward the second end 64. Optimal internal pressures and temperatures can be maintained. When the exothermic reaction 98 takes place a volume of the materials expands and the conical design allows for the expansion of the reactants. Further, the conical design of the reactor 60 also allows for the easy removal of the solid by-product.

The first end 62 and second end 64 can be defined by a ratio of cross-sectional area between one another. Such a ratio can be used to control the rate at which the chemical reaction 98 occurs. It is contemplated that the ratio of the first end 62 to the second end 64 can be as small as 4:5, or can be as large as 1:6. A greater ratio, such as 1:6 would need a high initial thermal input to initiate the reaction or a high ratio of $LiOH.H_2O$ and would be more difficult to control due to the rate of expansion toward the second end 64. The smaller ratio, such as 4:5 would require less initial heat to sustain the reaction and would be easier to control as compared to the greater ratio.

After a reaction occurs, maintenance can be easily performed by removing the cap 72, removing any remaining products of the reaction and replacing the hydrogen storage solid 80. Additionally, cleaning and servicing of the reactor 60 can be quickly and easily accomplished through removal of the cap 72, or even the entire reactor assembly 60.

Figure 7:
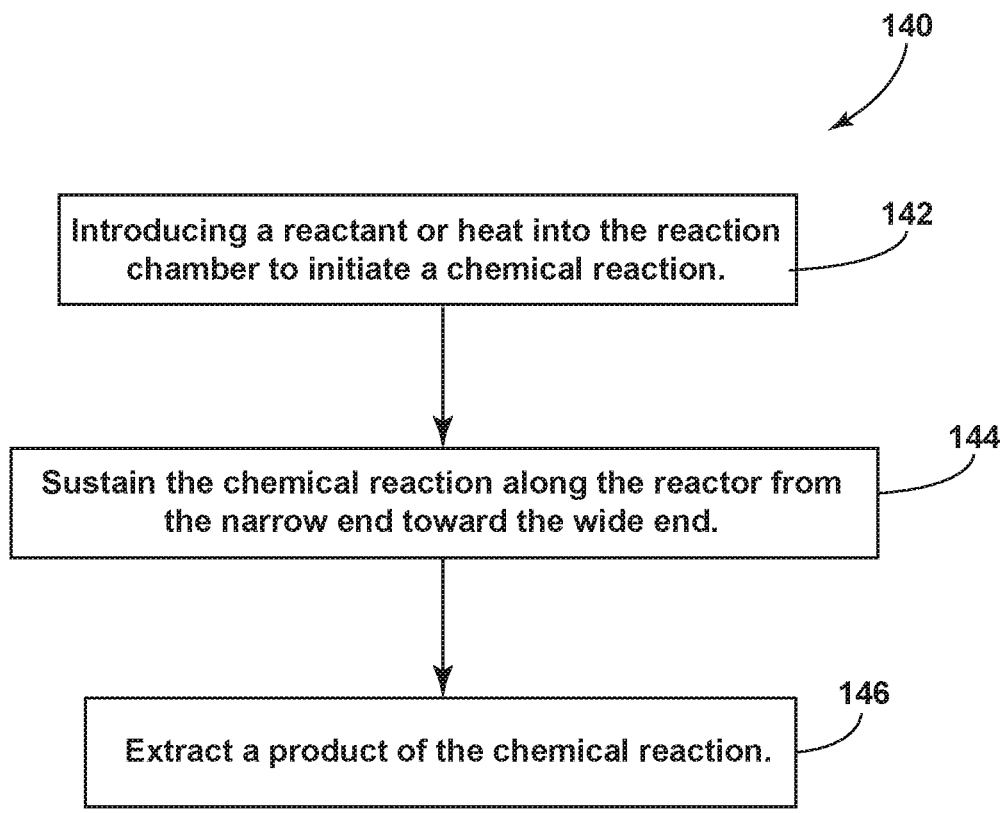
FIG. 7 is a flow chart illustrating a method of releasing hydrogen gas from a solid hydrogen storage system.

Looking at FIG. 7, a method 140 of liberating hydrogen gas from a solid hydrogen storage system can have the reactor 60 having an increasing cross-sectional area, defining the reaction chamber 66 with the hydrogen solid 80 stored therein. At 142, heat can be introduced into the reaction chamber at the first narrow end 62 to initiate the chemical reaction 98 with the hydrogen storage solid. Alternatively, a reactant, such as water or steam, can be introduced into the reaction chamber 66 to initiate the chemical reaction 98. Alternatively, heat can be supplied to the reaction chamber 66 at the first end 62 to initiate the reaction. It will be understood that the chemical reaction 98 can further be initiated by introducing heat in combination with introduction of the reactant at 142.

At 144 the chemical reaction 98 can be sustained along the longitudinal axis 122 of the reactor 60 from the first narrow end 62 toward the second wide end 64. Sustaining the chemical reaction 98 can include heating the reaction chamber 66, or can include removing heat therefrom, such as through use of the heat rods 76. Thus, the chemical reaction 98 can be sustained by heating or cooling the reactor 60 in order to slow, accelerate or further sustain the reaction 98 as necessary. The conical shape of the reactor 60 facilitates maintaining the chemical reaction 98 with a minimal overall burden on the fuel cell 26 or system input. At 146, a product of the chemical reaction 98, $H_2$, can be extracted and can be utilized elsewhere in the fuel cell 26 (FIG. 2).

The embodiments disclosed herein provide a method and apparatus for releasing hydrogen gas from a hydrogen storage solid. The technical effect is that the above described embodiments enable the controlled liberation of the hydrogen gases in accordance with design considerations and operational characteristics described herein. One advantage that can be realized in the above embodiments is that the above-described embodiments have superior hydrogen liberation capabilities without the safety concerns of storing gaseous hydrogen at high pressures. The solid-state storage of the hydrogen minimalizes the potential energy of the hydrogen storage system, eliminates the potential for hydrogen gas leaks at high pressure storage, and ensures the longevity of the hydrogen being stored. Longevity of the hydrogen being stored leads to fewer maintenance operations to maintain the overall system.

The above described reactor enables a balance to be achieved using the heat energy of a highly exothermic reaction to compensate for the system losses and the required heat for an endothermic decomposition reaction so that high yields of hydrogen are obtained. The mechanical design harnesses a small amount of additional heat to control the hydrogen production rate. In addition the reactor also prevents a plug from forming by the expansion of the reaction which could potentially over pressurize the reaction chamber.

Additionally, because the above-described embodiments of the disclosure operate at low pressures, no high pressure hydrogen infrastructure is required, reducing manufacturing and certification costs. Thus, the capabilities of hydrogen gases on demand provide for safer handling, lower pressure systems, and multiple methods of controlling the chemical reactions, ensuring the low pressure environment.

Another advantage of the above-described embodiments is that the individualized hydrogen storage units, along with selective control of the units, result in a hydrogen storage system that can be scaled to for the amount of hydrogen gases supplied, providing efficiencies of size and weight to suit the need. Additionally, the hydrogen storage solids, such as the metal hydride storing the hydrogen with chemical bonds as described herein have a high hydrogen storage capacity, providing a high weight of stored hydrogen, and a lower overall system weight. Further, problems associated with liquid or gaseous storage of hydrogen are eliminated, such as leakage. In yet another advantage, non-reversible or non-rechargeable hydrogen storage solids can be individually replaced, as described herein. When designing aircraft components, important factors to address are size, weight, and reliability. The above described hydrogen storage system results in a lower weight, smaller sized, increased performance, and increased reliability system. The stable storage of hydrogen in a solid state reduces maintenance needs and will lead to a lower product costs and lower operating costs. Reduced weight and size correlate to competitive advantages during flight.

In yet another advantage, utilizing the hydrogen storage solids within the conical shaped reaction chamber prevents a plug from forming by the increasing size of the reaction, minimizing the over-pressurization of the reaction chamber. Furthermore, the increasing width of the reaction chamber provides room for the expansion of the reactants and resultant products during the reaction. The increasing cross-sectional area provides for a small cross-sectional area for the initiation of the chemical reaction. This small cross-sectional area reduces the required initial heat input and reduces the amount of parasitic energy required to maintain the chemical reaction.

In yet another advantage, the shaping of the reaction chamber can be utilized to fine tune or control the reaction. A greater rate of increasing cross-sectional area for the reaction chamber will require greater heat input or higher ratio of $LiOH.H_2O$ to $LiOH$, while a lesser rate requires less heat or lower ratio of $LiOH.H_2O$ to $LiOH$. This rate can provide for fine tuning the reaction to require more or less heat, or even to produce heat.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of liberating hydrogen gas, comprising:
providing a hydrogen storage solid within a reactor, the reactor defining a reaction chamber having a narrow first end and a wide second end defining an increasing cross-sectional area within the reaction chamber;
introducing one of a reactant or heat into the reaction chamber to initiate a chemical reaction with the hydrogen storage solid; and
sustaining the chemical reaction along the reaction chamber by heating a plurality of heat rods which extend from the narrow first end toward the wide second end.

2. The method of claim 1, further comprising extracting a product of the chemical reaction from the reaction chamber.

3. The method of claim 2 wherein extracting the product comprises extracting hydrogen gas.

4. The method of claim 1, further comprising cooling the reactor to slow the chemical reaction.

5. The method of claim 1 wherein the hydrogen storage solid includes lithium hydride or magnesium hydride.

6. The method of claim 1, further comprising providing heat to the reaction chamber to preheat the reaction chamber prior to introducing one of heat or the reactant to initiate the chemical reaction.

7. The method of claim 1, further comprising providing heat to the reaction chamber during the chemical reaction to sustain the chemical reaction.

8. The method of claim 1 wherein the reactant is water.

9. The method of claim 8 wherein the reactant is steam.

10. The method of claim 1 wherein the hydrogen storage solid is a powder.

11. The method of claim 1 wherein providing the reaction chamber having the narrow first end and the wide second end defining the increasing cross-sectional area where the increasing cross-sectional area increases continuously from the narrow first end to the wide second end.

\* \* \* \* \*